(12) United States Patent
Fujii (10) Patent No.: US 12,308,728 B2
(45) Date of Patent: May 20, 2025

(54) ELECTRIC WORK MACHINE

(71) Applicant: MAKITA CORPORATION, Anjo (JP)

(72) Inventor: Fuminari Fujii, Anjo (JP)

(73) Assignee: MAKITA CORPORATION, Anjo (JP)

( * ) Notice: Subject to any disclaimer, the term of this patent is extended or adjusted under 35 U.S.C. 154(b) by 355 days.

(21) Appl. No.: 17/981,793

(22) Filed: Nov. 7, 2022

(65) Prior Publication Data

US 2023/0208252 A1    Jun. 29, 2023

(30) Foreign Application Priority Data

Dec. 28, 2021 (JP) ................. 2021-214868

(51) Int. Cl.
| | |
|---|---|
| *H02K 9/06* | (2006.01) |
| *H02K 9/28* | (2006.01) |
| *B27B 17/02* | (2006.01) |
| *B27B 17/08* | (2006.01) |
| *H02K 5/08* | (2006.01) |

(52) U.S. Cl.
CPC ................ *H02K 9/06* (2013.01); *H02K 9/28* (2013.01); *B25D 2250/095* (2013.01); *B27B 17/02* (2013.01); *B27B 17/08* (2013.01); *H02K 5/08* (2013.01)

(58) Field of Classification Search
CPC .. H02K 9/02; H02K 9/04; H02K 9/06; H02K 9/14; H02K 9/16; H02K 9/18; H02K 9/22
See application file for complete search history.

(56) References Cited

U.S. PATENT DOCUMENTS

| | | | |
|---|---|---|---|
| 2018/0100517 A1* | 4/2018 | Sawada | ............... A47L 9/00 |
| 2019/0001452 A1 | 1/2019 | Nagahama | |
| 2020/0006997 A1* | 1/2020 | Kim | .................. H02K 5/04 |
| 2020/0052544 A1* | 2/2020 | Zhu | ................... H02K 11/21 |

FOREIGN PATENT DOCUMENTS

JP            2019-17129 A        1/2019

* cited by examiner

*Primary Examiner* — Tran N Nguyen
*Assistant Examiner* — Masoud Vaziri
(74) *Attorney, Agent, or Firm* — Oliff PLC (57) ABSTRACT

An electric work machine is driven appropriately. An electric work machine includes a motor including a stator, a rotor rotatable relative to the stator, and a rotor shaft fixed to the rotor, an output unit drivable by the rotor shaft, a plurality of heat-radiating fins, a motor case having an outer surface receiving the plurality of heat-radiating fins and accommodating the stator and the rotor, a cooling fan located outside the motor case and rotatable by the rotor shaft, and a duct including a guide to guide air through the cooling fan to a fin passage between adjacent heat-radiating fins of the plurality of heat-radiating fins.

15 Claims, 8 Drawing Sheets

ELECTRIC WORK MACHINE

CROSS-REFERENCE TO RELATED APPLICATIONS

This application claims the benefit of priority to Japanese Patent Application No. 2021-214868, filed on Dec. 28, 2021, the entire contents of which are hereby incorporated by reference.

BACKGROUND

1. Technical Field

The present disclosure relates to an electric work machine.

2. Description of the Background

In the field of electric work machines, a known power tool includes a motor, as described in Japanese Unexamined Patent Application Publication No. 2019-017129.

BRIEF SUMMARY

A technique is awaited for appropriately driving an electric work machine when its motor generates heat.

One or more aspects of the present disclosure are directed to an electric work machine that is driven appropriately.

A first aspect of the present disclosure provides an electric work machine, including:
  a motor including
    a stator,
    a rotor rotatable relative to the stator, and
    a rotor shaft fixed to the rotor;
  an output unit drivable by the rotor shaft;
  a plurality of heat-radiating fins;
  a motor case having an outer surface receiving the plurality of heat-radiating fins, the motor case accommodating the stator and the rotor;
  a cooling fan located outside the motor case and rotatable by the rotor shaft; and
  a duct including a guide to guide air through the cooling fan to a fin passage between adjacent heat-radiating fins of the plurality of heat-radiating fins.

A second aspect of the present disclosure provides an electric work machine, including:
  a motor including
    a stator,
    a rotor rotatable relative to the stator, and
    a rotor shaft fixed to the rotor;
  an output unit drivable by the rotor shaft;
  a plurality of heat-radiating fins;
  a motor case having an outer surface receiving the plurality of heat-radiating fins, the motor case accommodating the stator and the rotor;
  a cooling fan located outside the motor case and rotatable by the rotor shaft; and
  a duct covering a fin passage between adjacent heat-radiating fins of the plurality of heat-radiating fins, the duct configured to allow outside air to pass through the fin passage.

The electric work machine according to the above aspect of the present disclosure is driven appropriately.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an electric work machine 1.

The electric work machine 1 includes a motor 12. In the embodiments, a direction parallel to a rotation axis AX of the motor 12 is referred to as an axial direction for convenience. A direction radial from the rotation axis AX of the motor 12 is referred to as a radial direction or radially for convenience. A direction about the rotation axis AX of the motor 12 is referred to as a circumferential direction, circumferentially, or a rotation direction for convenience.

A position nearer the center of the motor 12 in the axial direction, or an axial direction toward the center of the motor 12, is referred to as axially inward for convenience. A position farther from the center of the motor 12 in the axial direction, or an axial direction away from the center of the motor 12, is referred to as axially outward for convenience. A position nearer the rotation axis AX of the motor 12 in the radial direction, or a radial direction toward the rotation axis AX, is referred to as radially inward for convenience. A position farther from the rotation axis AX of the motor 12 in the radial direction, or a radial direction away from the rotation axis AX, is referred to as radially outside or radially outward for convenience. A position in one circumferential direction, or one circumferential direction, is referred to as a first circumferential direction for convenience. A position in the other circumferential direction, or the other circumferential direction, is referred to as a second circumferential direction for convenience.

Electric Work Machine

Figure 1:
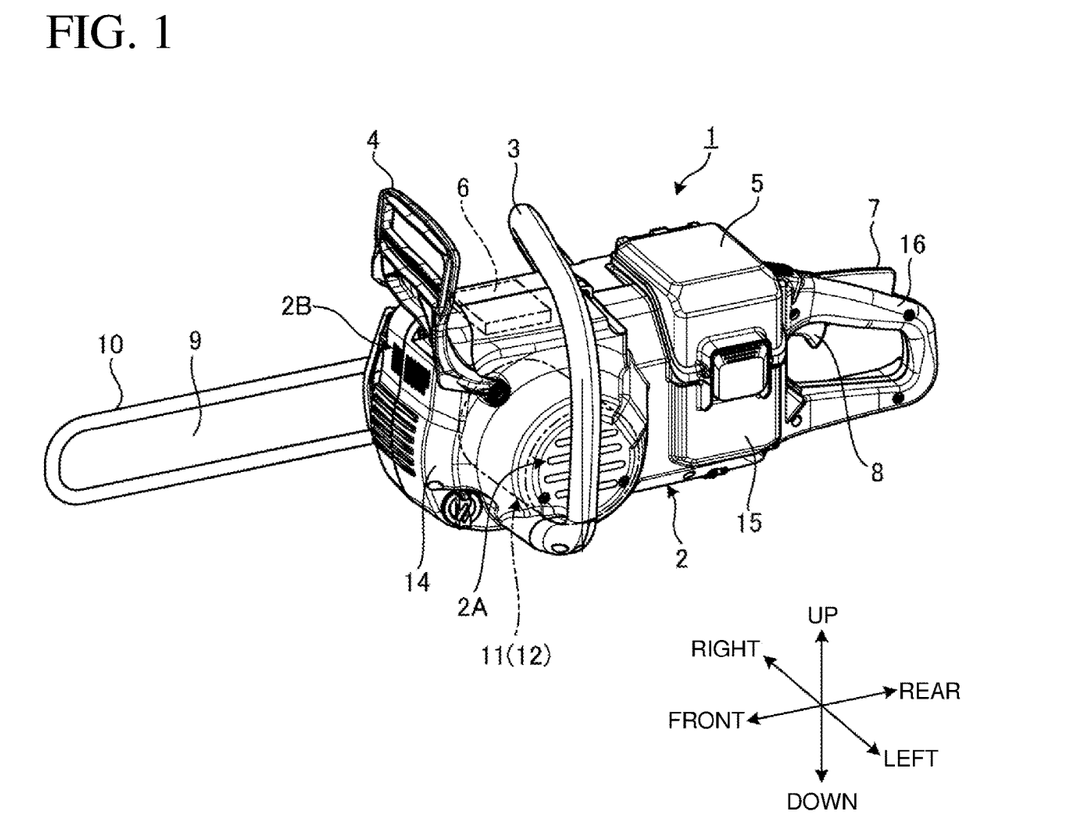
FIG. 1 is a left perspective view of an electric work machine according to an embodiment.

FIG. 1 is a left perspective view of an electric work machine 1 according to an embodiment. The electric work machine 1 according to the present embodiment is a chain saw as an example of outdoor power equipment.

The electric work machine 1 includes a housing 2, a front grip 3, a hand guard 4, a battery cover 5, a controller 6, a trigger lock lever 7, a trigger switch 8, a guide bar 9, a saw chain 10, and a motor assembly 11.

The housing 2 is formed from a synthetic resin. The housing 2 includes a motor compartment 14, a battery holder 15, and a rear grip 16.

The motor compartment 14 accommodates the motor assembly 11. The motor assembly 11 includes the motor 12.

The battery holder 15 holds a battery pack (not shown). The battery holder 15 includes a battery mount to which the battery pack is attached. The battery holder 15 holds the battery pack with the battery mount in between. The battery holder 15 is connected to the rear end of the motor compartment 14. The battery cover 5 covers the battery pack held in the battery holder 15. The battery pack is accommodated in the battery cover 5. The battery pack is placed in an accommodation space defined by the battery cover 5 and the battery holder 15.

The battery pack is detachable from the battery holder 15. The battery pack includes a secondary battery. The battery pack in the present embodiment includes a rechargeable lithium-ion battery. The battery pack functions as a power supply for the electric work machine 1. The battery pack is held in the battery holder 15 to power the electric work machine 1.

The rear grip 16 is grippable by a hand of a user of the electric work machine 1. The rear grip 16 is connected to the rear end of the battery holder 15. A portion of the rear grip 16 is connected to an upper portion of the rear end of the battery holder 15. A portion of the rear grip 16 is connected to a lower portion of the rear end of the battery holder 15.

The motor compartment 14 has an inlet port 2A in its left portion. The motor compartment 14 has an outlet port 2B in its front portion. Air outside the housing 2 flows into the housing 2 through the inlet port 2A. Air inside the housing 2 flows out of the housing 2 through the outlet port 2B.

The front grip 3 is grippable by a hand of the user of the electric work machine 1. The front grip 3 is formed from a synthetic resin. The front grip 3 is a pipe. The front grip 3 is connected to the housing 2. The front grip 3 has its left end connected to the left side surface of the motor compartment 14. The front grip 3 has its right end connected to the right side surface of the battery holder 15.

The hand guard 4 is located in front of the front grip 3. The hand guard 4 is connected to an upper portion of the motor compartment 14.

The controller 6 outputs control signals for controlling the electric work machine 1. The controller 6 controls a drive current supplied from the battery pack to the motor 12. The controller 6 is accommodated in the motor compartment 14.

The trigger lock lever 7 is operable by the user of the electric work machine 1 to allow the trigger switch 8 to be operable. The trigger lock lever 7 is located on the rear grip 16.

The trigger switch 8 is operable by the user of the electric work machine 1 to drive the motor 12 in the motor assembly 11. The trigger switch 8 is located on the rear grip 16. The user of the electric work machine 1 holding the rear grip 16 with the hand operates the trigger lock lever 7 to operate the trigger switch 8 with a finger. A drive current is supplied to the motor 12 to drive the motor 12.

The guide bar 9 guides the saw chain 10. The guide bar 9 is a plate elongated in the front-rear direction. The guide bar 9 extends frontward from the housing 2.

The saw chain 10 functions as an output unit of the electric work machine 1 driven by the motor 12. The saw chain 10 includes multiple cutters that are connected to one another. The saw chain 10 is located along the peripheral edge of the guide bar 9. The motor 12 and the saw chain 10 are connected with a power transmission including a sprocket 201 (refer to FIG. 6). In response to the trigger switch 8 being operated to drive the motor 12, the saw chain 10 moves along the peripheral edge of the guide bar 9.

Motor Assembly

Figure 2:
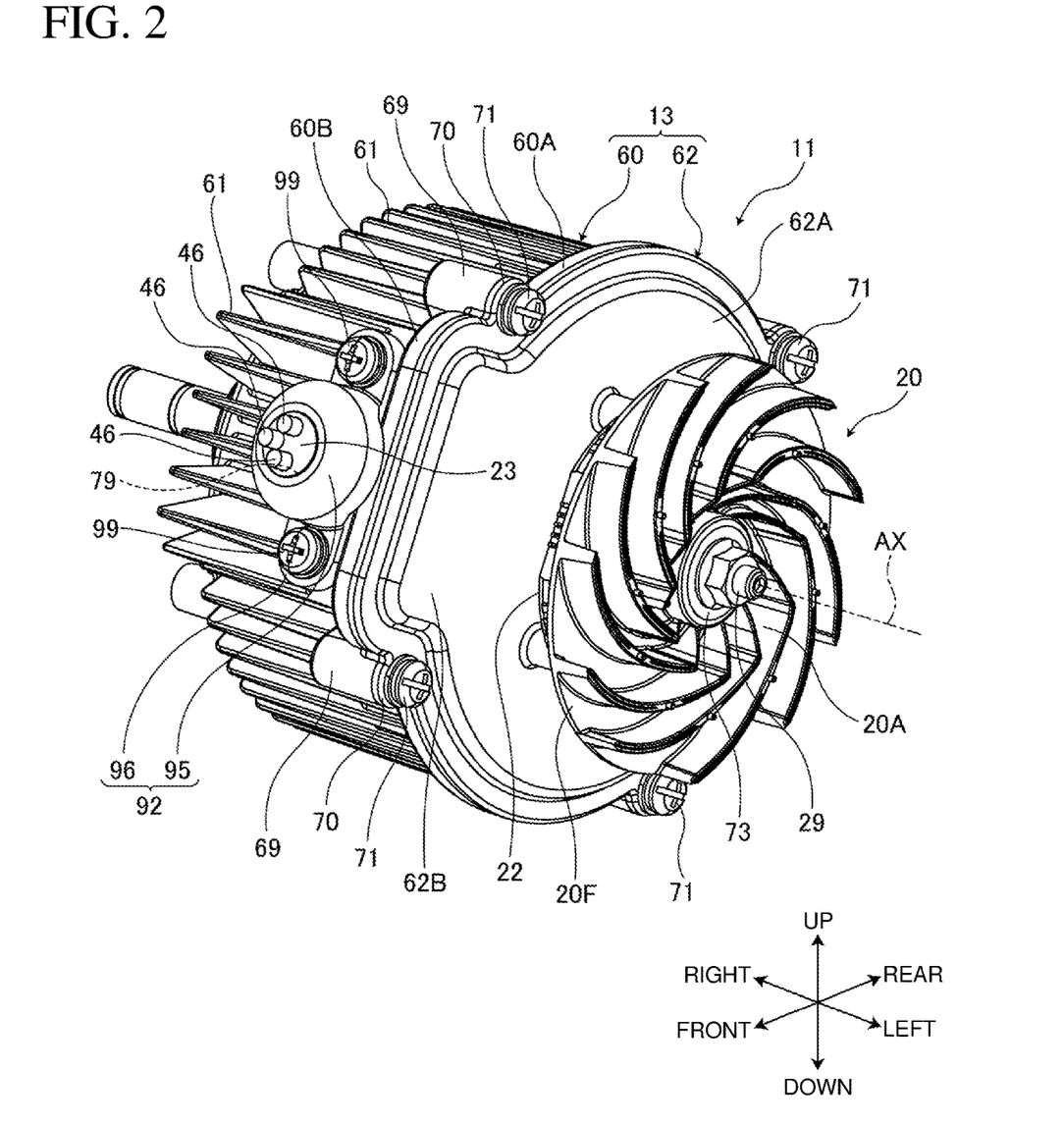
FIG. 2 is a left perspective view of a motor assembly in the embodiment.
Figure 3:
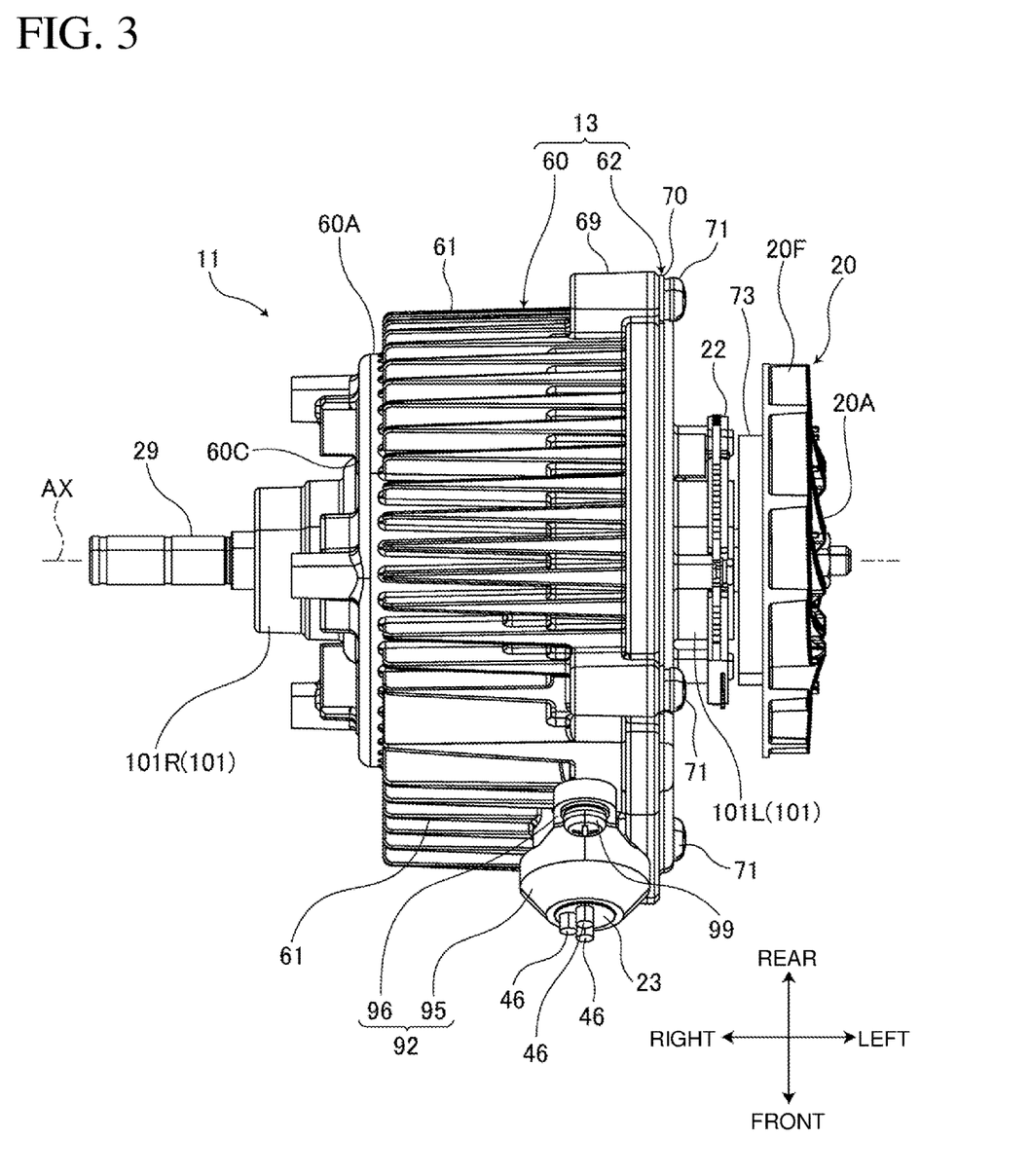
FIG. 3 is a side view of the motor assembly in the embodiment.
Figure 4:
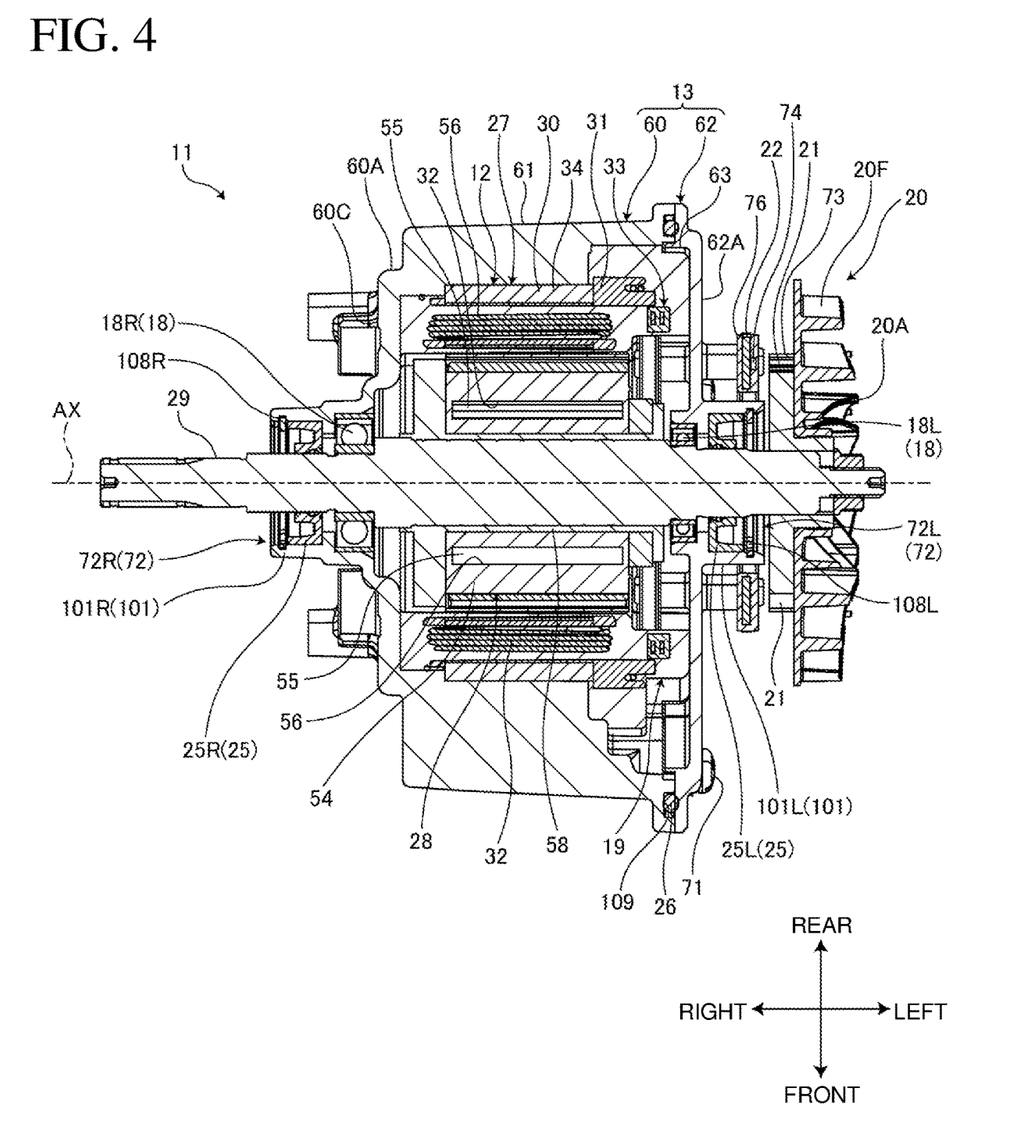
FIG. 4 is a longitudinal sectional view of the motor assembly in the embodiment.
Figure 5:
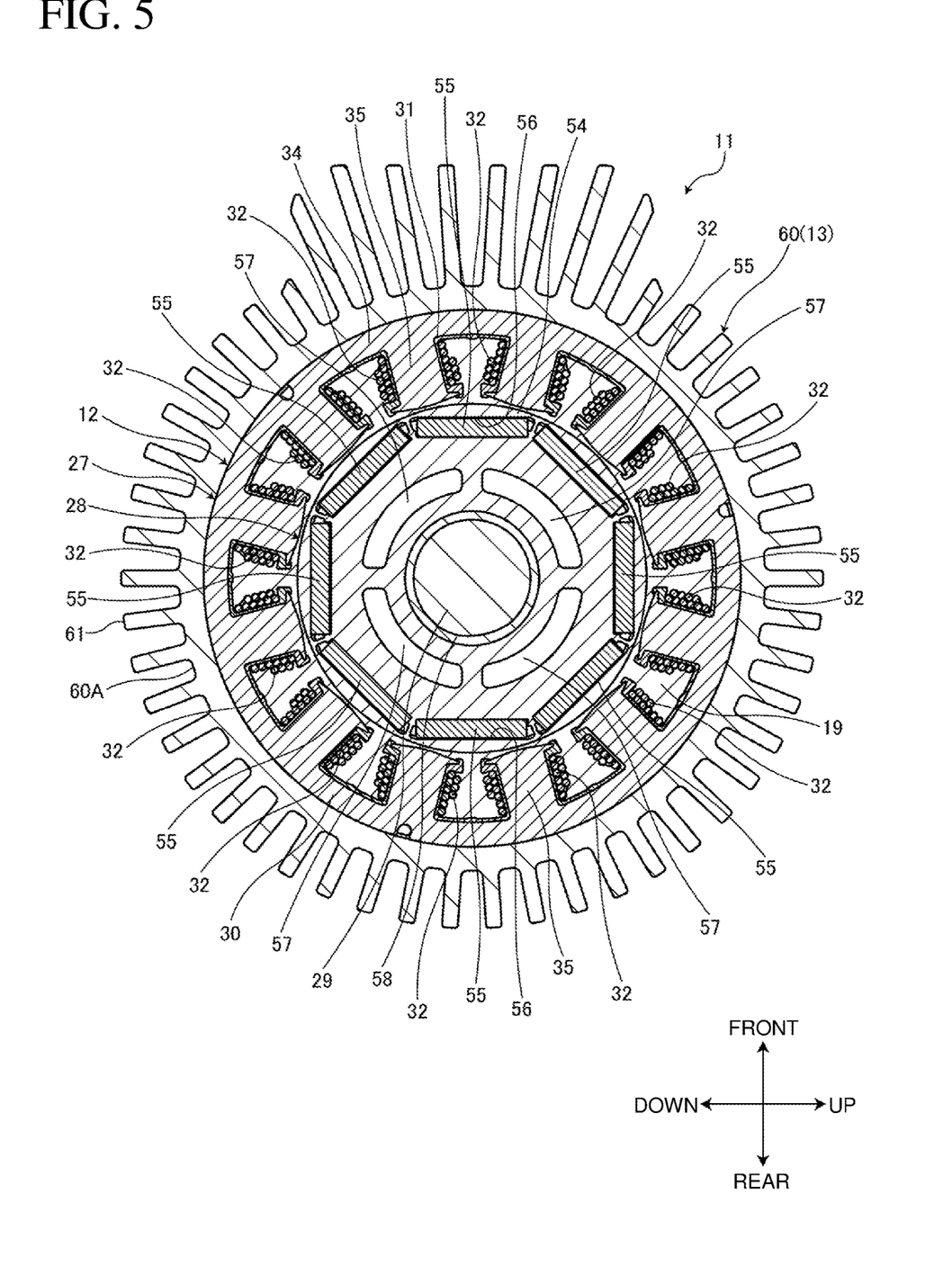
FIG. 5 is a cross-sectional view of the motor assembly in the embodiment.

FIG. 2 is a left perspective view of the motor assembly 11 in the present embodiment. FIG. 3 is a side view of the motor assembly 11 in the present embodiment. FIG. 4 is a longitudinal sectional view of the motor assembly 11 in the present embodiment. FIG. 5 is a cross-sectional view of the motor assembly 11 in the present embodiment.

The motor assembly 11 includes the motor 12, a motor case 13, bearings 18, a heat-transfer resin portion 19, a cooling fan 20, a fan bush 73, a sensor board 22, a seal 23, seals 25, and a seal 26.

The motor 12 is a power source for the electric work machine 1. The motor 12 is an electric motor drivable with a drive current supplied from the battery pack.

The motor 12 is a brushless inner-rotor motor. The motor 12 includes a stator 27, a rotor 28, and a rotor shaft 29. The rotor 28 rotates relative to the stator 27. The rotor shaft 29 is fixed to the rotor 28. The stator 27 surrounds at least a part of the rotor 28. The rotor 28 rotates about the rotation axis AX. The saw chain 10 is driven by the rotor shaft 29.

The rotor 28 in the present embodiment has the rotation axis AX extending laterally. The axial direction parallel to the rotation axis AX of the rotor 28 corresponds to the lateral direction.

The stator 27 includes a stator core 30, an insulator 31, multiple coils 32, and a busbar unit 33.

The stator core 30 includes multiple steel plates stacked on one another. The steel plates are metal plates formed from iron as a main component. The stator core 30 includes an annular yoke 34 and multiple (12 in the present embodiment) teeth 35. The teeth 35 protrude radially inward from the inner surface of the yoke 34. The yoke 34 surrounds the rotation axis AX. The multiple teeth 35 are located at circumferentially equal intervals.

The insulator 31 covers at least a part of the surface of the stator core 30. The insulator 31 covers at least the outer peripheral surfaces of the teeth 35. The insulator 31 is formed from a synthetic resin. The insulator 31 is fixed to the stator core 30. The insulator 31 is integral with the stator core 30. The insulator 31 is fixed to the stator core 30 by insert molding.

The coils 32 are wound around the teeth 35 with the insulator 31 in between. The coils 32 and the stator core 30 are insulated from each other by the insulator 31. The multiple (12 in the present embodiment) coils 32 are located circumferentially.

The busbar unit 33 is fixed to the insulator 31. The busbar unit 33 includes a short-circuiting member that connects (short-circuits) a pair of coils 32 facing each other in the radial direction. The busbar unit 33 is connected to power lines 46. A drive current from the battery pack is supplied to the coils 32 through the controller 6, the power lines 46, and the busbar unit 33.

The controller 6 controls the motor 12. The controller 6 controls the drive current supplied from the battery pack to the coils 32.

The rotor 28 includes a rotor core 54 and rotor magnets 55.

The rotor core 54 includes multiple steel plates stacked on one another. The steel plates are metal plates formed from iron as a main component. The rotor core 54 surrounds the rotation axis AX. The stator core 30 surrounds the rotor core 54.

The rotor magnets 55 are permanent magnets. The rotor magnets 55 are held by the rotor core 54. The rotor magnets 55 are located inside the rotor core 54. Multiple (eight in the present embodiment) rotor magnets 55 are located circumferentially.

The rotor core 54 has multiple magnet slots 56 located circumferentially at intervals. The magnet slots 56 extend through the right and left end faces of the rotor core 54. The rotor magnets 55 are received in the respective magnet slots 56.

The rotor core 54 includes multiple (four in the present embodiment) hollow portions 57 located circumferentially at intervals. The hollow portions 57 extend through the right and left end faces of the rotor core 54. The hollow portions 57 are located radially inward from the magnet slots 56. The hollow portions 57 reduce the weight of the rotor core 54.

The rotor shaft 29 extends in the axial direction. The rotor shaft 29 has the central axis aligned with the rotation axis AX. The rotor shaft 29 is located inward from the rotor core 54. The rotor core 54 is fixed to the rotor shaft 29. In the present embodiment, a cylindrical member 58 surrounds the rotor shaft 29. The cylindrical member 58 is formed from an electrically insulating material. The rotor shaft 29 is fixed to the rotor core 54 with the cylindrical member 58 in between. The rotor shaft 29 includes a left portion protruding leftward from the left end face of the rotor core 54. The rotor shaft 29 includes a right portion protruding rightward from the right end face of the rotor core 54.

A drive current is supplied to the coils 32 from the battery pack through the controller 6 to generate a rotating magnetic field in the stator 27. This causes the rotor 28 and the rotor shaft 29 to rotate about the rotation axis AX.

The motor case 13 accommodates at least a part of the motor 12. The motor case 13 in the present embodiment accommodates at least the stator 27 and the rotor 28. The motor case 13 has an internal space accommodating the stator 27 and the rotor 28. The stator 27 surrounds at least a part of the rotor 28 in the internal space of the motor case 13. The internal space is closed. The internal space in the present embodiment is sealed substantially hermetically. The rotor shaft 29 is partially located in the internal space.

The motor case 13 is formed from a metal. The motor case 13 in the present embodiment is formed from aluminum. The motor case 13 may be formed from an aluminum die-casting alloy (ADC12).

The motor case 13 includes a body 60, heat-radiating fins 61, and a lid 62.

The body 60 accommodates the stator 27 and the rotor 28. The stator 27 and the rotor 28 are located inside the body 60.

The body 60 includes a cylindrical portion 60A, an extension 60B, and a wall 60C. The cylindrical portion 60A surrounds the rotation axis AX. The extension 60B protrudes frontward from the cylindrical portion 60A. The wall 60C is connected to the right end of the cylindrical portion 60A. The body 60 and the extension 60B have an opening 63 in their left ends. The stator 27 is placed inside the body 60 through the opening 63.

The heat-radiating fins 61 are located on the outer surface of the cylindrical portion 60A. Multiple heat-radiating fins 61 are located on the outer surface of the cylindrical portion 60A. The heat-radiating fins 61 protrude radially outward from the outer surface of the cylindrical portion 60A. Each of the multiple heat-radiating fins 61 extends in the axial direction on the outer surface of the cylindrical portion 60A. The multiple heat-radiating fins 61 are located circumferentially at intervals. As shown in FIGS. 2 and 3, the heat-radiating fins 61 each have the width decreasing gradually toward the right end. As shown in FIG. 5, the heat-radiating fins 61 located frontward from the cylindrical portion 60A have, in the radial direction, dimensions greater than the dimensions of the heat-radiating fins 61 located rearward, leftward, and rightward from the cylindrical portion 60A.

The lid 62 is fixed to the body 60 to cover the opening 63 of the body 60. This defines an internal space between the body 60 and the lid 62. At least a part of the motor 12 including the stator 27 is placed inside the body 60, and then the opening 63 of the body 60 is covered with the lid 62. Thus, the motor 12 is at least partially located in the internal space.

The body 60 includes multiple screw bosses 69 located around the opening 63. In the present embodiment, four screw bosses 69 are located circumferentially at intervals. Each screw boss 69 has a threaded hole. The lid 62 includes multiple screw bosses 70 on its peripheral edge. In the present embodiment, four screw bosses 70 are located circumferentially at intervals. Each screw boss 70 has an opening. A screw 71 has its distal end fastened into the threaded hole in the corresponding screw boss 69, with its middle portion received in the opening in the screw boss 70. This structure fixes the body 60 and the lid 62.

The lid 62 includes a disk 62A and an extension 62B. The disk 62A is connected to the cylindrical portion 60A. The extension 62B is connected to the extension 60B. The extension 62B protrudes frontward from the disk 62A.

The bearings 18 support the rotor shaft 29. The rotor shaft 29 is rotatably supported by the bearings 18. The bearings 18 are supported on the motor case 13.

The motor case 13 has shaft holes 72 receiving at least a part of the rotor shaft 29. The shaft holes 72 connect the internal space and the external space of the motor case 13. The shaft holes 72 include a shaft hole 72L and a shaft hole 72R. The shaft hole 72L receives the left portion of the rotor shaft 29. The shaft hole 72R receives the right portion of the rotor shaft 29. The shaft hole 72L is located in the disk 62A in the lid 62. The shaft hole 72R is located in the wall 60C of the body 60.

The motor case 13 includes peripheral walls 101 defining the shaft holes 72. The peripheral walls 101 are substantially cylindrical. The peripheral walls 101 include a peripheral wall 101L and a peripheral wall 101R. The peripheral wall 101L defines the shaft hole 72L. The peripheral wall 101R defines the shaft hole 72R. The peripheral wall 101L is located on the disk 62A in the lid 62. The peripheral wall 101L protrudes leftward from the left surface of the disk 62A. The peripheral wall 101R is located on the wall 60C of the body 60. The peripheral wall 101R protrudes rightward from the right surface of the wall 60C.

The bearings 18 include a left bearing 18L and a right bearing 18R. The left bearing 18L supports the left portion of the rotor shaft 29. The right bearing 18R supports the right portion of the rotor shaft 29. The left bearing 18L is received in the shaft hole 72L. The right bearing 18R is received in the shaft hole 72R.

The right and left ends of the rotor shaft 29 are located outside the motor case 13. The right end of the rotor shaft 29 is connected to the saw chain 10 with the power transmission including the sprocket 201 (refer to FIG. 6). The saw chain 10 is driven by the rotor shaft 29. The rotor shaft 29 rotates to drive the saw chain 10.

The heat-transfer resin portion 19 is accommodated in the motor case 13. The heat-transfer resin portion 19 is in contact with the coils 32 and the motor case 13. The heat-transfer resin portion 19 covers the coils 32. The heat-transfer resin portion 19 in the present embodiment is in contact with the stator core 30 and the insulator 31.

The heat-transfer resin portion 19 is formed from a synthetic resin. The heat-transfer resin portion 19 is highly thermally conductive and electrically insulating. For example, when the insulator 31 is formed from a nylon resin with a thermal conductivity of 0.2 W/(m·K), the thermal conductivity of the synthetic resin used for the heat-transfer resin portion 19 is higher than 0.2 W/(m·K).

An insulating synthetic resin with a thermal conductivity higher than 0.2 W/(m·K) is, for example, an unsaturated polyester resin. The heat-transfer resin portion 19 may be formed from a nylon resin containing insulating, thermally conductive fillers.

After the stator 27 is placed inside the body 60 through the opening 63, a heated and melted synthetic resin is fed inside the body 60 through the opening 63. The synthetic resin fed inside the body 60 solidifies to form the heat-transfer resin portion 19.

The cooling fan 20 is located outside the motor case 13. The cooling fan 20 faces at least a part of the outer surface of the motor case 13. The cooling fan 20 is fixed to the rotor shaft 29. The cooling fan 20 is rotated by the rotor shaft 29.

The cooling fan 20 in the present embodiment is located leftward from the motor case 13. The cooling fan 20 is fixed to the left end of the rotor shaft 29 located outside the motor case 13. The cooling fan 20 faces at least a part of the outer surface of the motor case 13. The cooling fan 20 in the present embodiment faces at least a part of the lid 62.

The cooling fan 20 in the present embodiment is a centrifugal fan. The cooling fan 20 has an inflow port 20A and an outflow port 20F. The inflow port 20A is located at the left end of the cooling fan 20. The outflow port 20F is on the peripheral edge radially outward from the cooling fan 20. The cooling fan 20 generates an airflow to cool the motor case 13. As the rotor shaft 29 rotates, the cooling fan 20 rotates together with the rotor shaft 29. Air around the cooling fan 20 is then drawn through the inflow port 20A. The air drawn through the inflow port 20A is blown out through the outflow port 20F. At least a part of the air blown out through the outflow port 20F hits the outer surface of the motor case 13. The motor case 13 is thus cooled.

The cooling fan 20 in the present embodiment is fixed to the rotor shaft 29 with the fan bush 73. The fan bush 73 is an intermediate member connecting the rotor shaft 29 and the cooling fan 20. The fan bush 73 is located outside the motor case 13 to connect the left end of the rotor shaft 29 and the cooling fan 20. As the cooling fan 20 rotates, the fan bush 73 rotates together with the cooling fan 20.

The fan bush 73 supports the sensor magnets 21. The fan bush 73 is fixed to the rotor shaft 29 outside the motor case 13. As the rotor shaft 29 rotates, the fan bush 73 rotates together with the rotor shaft 29.

The sensor magnets 21 are fixed to the fan bush 73. The sensor magnets 21 are permanent magnets. Multiple (eight in the present embodiment) sensor magnets 21 are located circumferentially at intervals. The sensor magnets 21 and the rotor magnets 55 are at the same positions in the circumferential direction.

The sensor magnets 21 are located inside the fan bush 73. The fan bush 73 in the present embodiment has multiple magnet slots located circumferentially at intervals. The sensor magnets 21 are received in the magnet slots in the fan bush 73.

The sensor magnets 21 are rotated by the rotor 28. As the fan bush 73 is rotated by the rotor 28 and the rotor shaft 29, the sensor magnets 21 rotate.

The sensor board 22 supports a magnetic sensor 74. The sensor board 22 is located outside the motor case 13. The sensor board 22 is annular. The sensor board 22 surrounds the rotor shaft 29. The sensor board 22 includes a printed wiring board (PWB). The material used for the sensor board 22 is, for example, an epoxy resin. The sensor board 22 may be formed from a metal such as aluminum, or from a heat-radiating resin with higher thermal conductivity than an epoxy resin.

In the axial direction, the sensor board 22 is located between at least a part of the motor case 13 and the fan bush 73. The sensor board 22 is fixed to the motor case 13. The sensor board 22 is fastened to the lid 62 with screws.

The magnetic sensor 74 detects the sensor magnets 21. The magnetic sensor 74 is, for example, a Hall device. The magnetic sensor 74 is supported by the sensor board 22 to face the sensor magnets 21. The magnetic sensor 74 detects the sensor magnets 21 to detect rotation of the rotor 28. The magnetic sensor 74 transmits detection signals to the controller 6.

In the present embodiment, a resin film 76 at least partially covers the surface of the magnetic sensor 74 and the surface of the sensor board 22. The resin film 76 functions as a protective film.

The motor case 13 includes a wiring path 79 connecting the internal space and the external space of the motor case 13. The wiring path 79 is defined on the extension 60B of the body 60. The power lines 46 are located in the wiring path 79.

The seal 23 holding the power lines 46 is placed in the wiring path 79. The seal 23 seals between each power line 46 and the motor case 13. The seal 23 is substantially cylindrical. The seal 23 is formed from rubber. The seal 23 has three holes receiving the three power lines 46. The three holes are parallel to one another. Each hole receives the corresponding power line 46. The outer surface of each power line 46 and the inner surface of the corresponding hole are in close contact with each other.

The seal 23 placed in the wiring path 79 is fixed to the motor case 13 with a fixing member 92. The fixing member 92 includes a peripheral wall 95 and fasteners 96. The peripheral wall 95 covers the seal 23. The fasteners 96 are fixed to the motor case 13. With the peripheral wall 95 covering the seal 23, the fasteners 96 are fastened to the motor case 13 with screws 99. The fixing member 92 then moves backward toward the motor case 13. The seal 23 is thus fastened to the motor case 13.

The seals 25 seal between the rotor shaft 29 and the motor case 13. The seals 25 include oil seals. The seals 25 are received in the shaft holes 72. The seals 25 are press-fitted between the rotor shaft 29 and the peripheral walls 101. The seals 25 are supported by the peripheral walls 101. The seals 25 include a seal 25L and a seal 25R. The seal 25L seals between the left portion of the rotor shaft 29 and the motor case 13. The seal 25R seals between the right portion of the rotor shaft 29 and the motor case 13. The seal 25L is received in the shaft hole 72L. The seal 25R is received in the shaft hole 72R.

A stopper 108L is located at the left of the seal 25L. A stopper 108R is located at the right of the seal 25R. The stopper 108L prevents the seal 25L from slipping out of the shaft hole 72L. The stopper 108R prevents the seal 25R from slipping out of the shaft hole 72R. The stopper 108L and the stopper 108R are, for example, circlips.

The seal 26 seals between the body 60 and the lid 62. The seal 26 includes an O-ring. The body 60 has a recess 109 surrounding the opening 63. The seal 26 is received in the recess 109.

Duct Member

Figure 6:
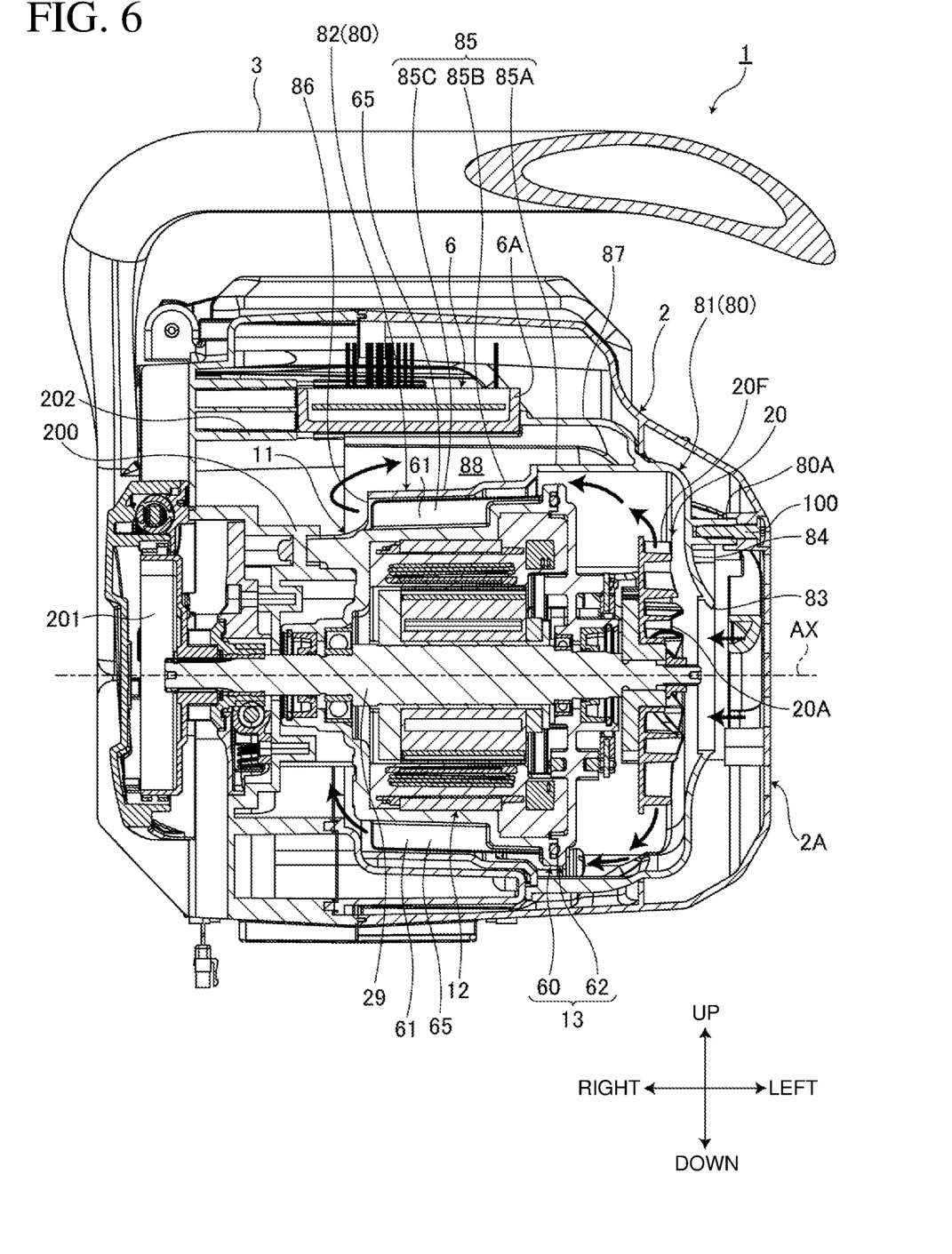
FIG. 6 is a longitudinal sectional view of the electric work machine according to the embodiment.

FIG. 6 is a longitudinal sectional view of the electric work machine 1 according to the present embodiment. As shown in FIG. 6, the electric work machine 1 includes a duct 80 surrounding the motor assembly 11. The duct 80 is accommodated in the housing 2.

The motor assembly 11 is placed in the housing 2 with the rotation axis AX of the motor 12 extending in the lateral direction. The cooling fan 20 is fixed to the left end of the rotor shaft 29. The inflow port 20A of the cooling fan 20 faces leftward. The sprocket 201 is fixed to the right end of the rotor shaft 29. The sprocket 201 is connected to the saw chain 10.

The duct 80 is substantially cylindrical. The motor assembly 11 is located in the duct 80. The duct 80 has an air inlet 83 at its left end and an air outlet 86 at its right end. The motor case 13 in the motor assembly 11 is fixed to the duct 80.

The duct 80 includes a first duct 81 and a second duct 82. The second duct 82 is fixed to the first duct 81. The first duct 81 is located leftward from the second duct 82. The first duct 81 and the second duct 82 are connected to define an air channel in the duct 80.

Figure 7:
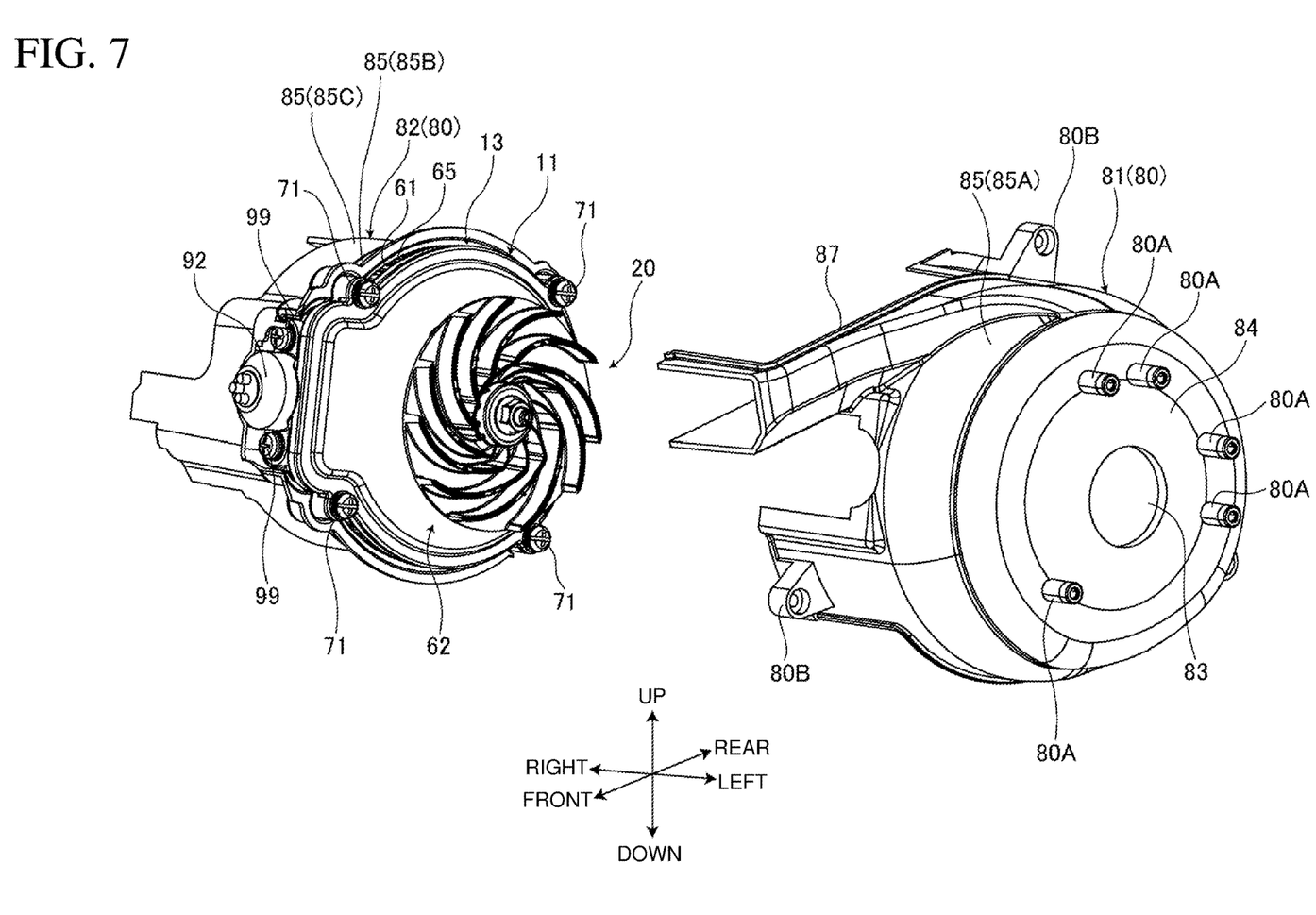
FIG. 7 is an exploded perspective view of the motor assembly and a duct in the embodiment.
Figure 8:
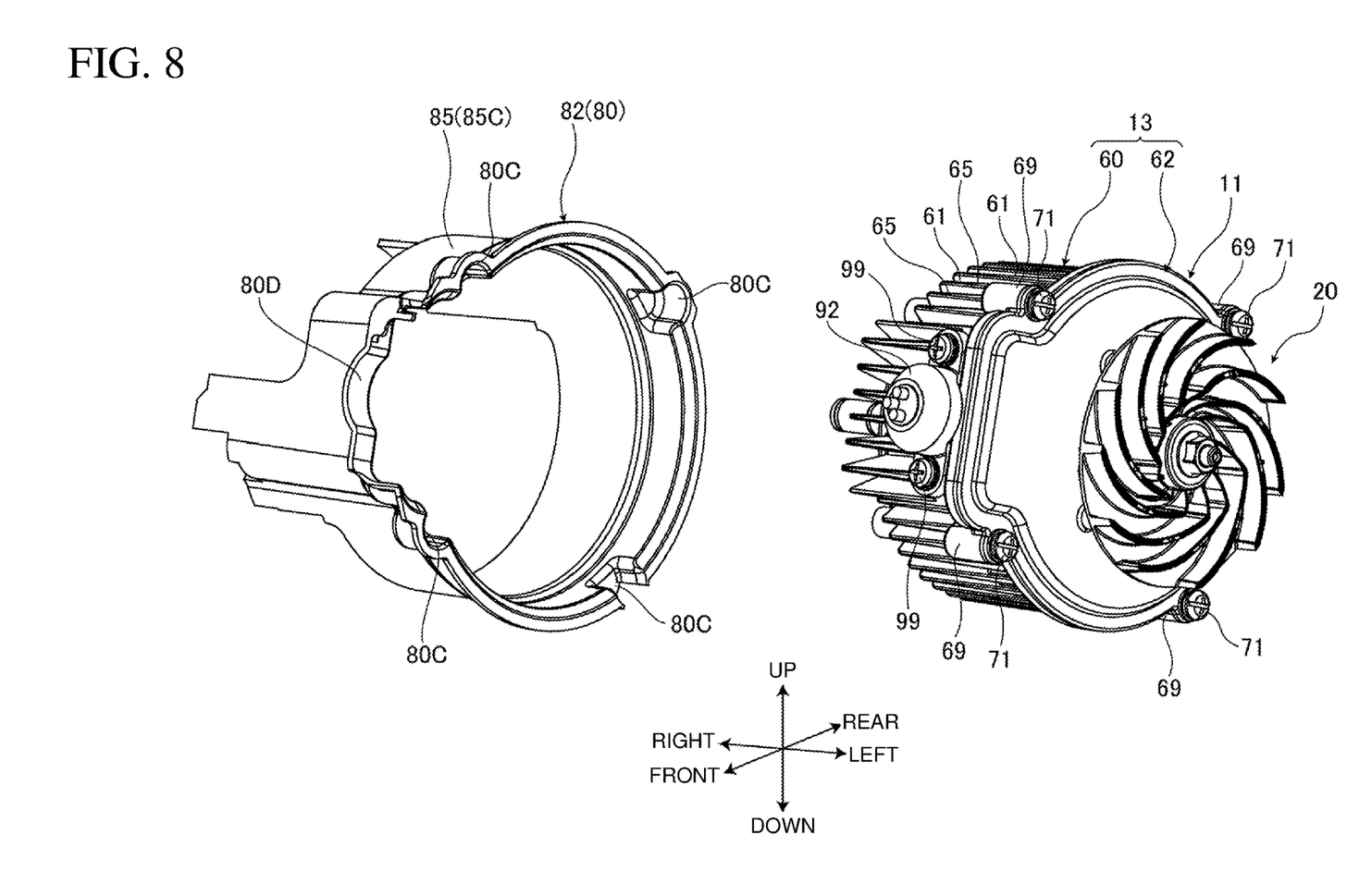
FIG. 8 is an exploded perspective view of the motor assembly and a second duct in the embodiment.

FIG. 7 is an exploded perspective view of the motor assembly 11 and the duct 80 in the present embodiment. FIG. 8 is an exploded perspective view of the motor assembly 11 and the second duct 82 in the present embodiment.

The first duct 81 is fixed to a left portion of the housing 2. The first duct 81 includes multiple screw bosses 80A on its left portion. The first duct 81 is fastened to the left portion of the housing 2 with screws 100 placed into the threaded holes in the screw bosses 80A. The screws 100 are placed into the threaded holes in the screw bosses 80A through the threaded openings in the left portion of the housing 2. As shown in FIG. 7, the first duct 81 includes multiple screw bosses 80B on its peripheral edge. The first duct 81 is fastened to the left portion of the housing 2 with screws (not shown) placed into the threaded holes in the screw bosses 80B.

The second duct 82 is fixed to a right portion of the housing 2. The housing 2 includes the right portion including a support 200 on its inner surface. The support 200 protrudes leftward from the inner surface of the right portion of the housing 2. The second duct 82 is fixed to the support 200. As shown in FIG. 8, the second duct 82 is substantially cylindrical. The second duct 82 has four recesses 80C and a single recess 80D. The screw bosses 69 are received in the recesses 80C. The fixing member 92 is received in the recess 80D.

The duct 80 includes a disk 84 and a guide 85.

The disk 84 is located in the left portion of the first duct 81. The inlet 83 is at the center of the disk 84. The disk 84 includes multiple screw bosses 80A on its left surface. The screw bosses 80A protrude leftward from the left surface of the disk 84.

The guide 85 surrounds the rotation axis AX. The guide 85 is connected to the periphery of the disk 84. The guide 85 extends rightward from the periphery of the disk 84. The guide 85 includes a direction converter 85A, an intermediate guide 85B, and a cover 85C. The intermediate guide 85B is located rightward from the direction converter 85A. The cover 85C is located rightward from the intermediate guide 85B. The direction converter 85A is located in the first duct 81. The intermediate guide 85B and the cover 85C are located in the second duct 82. The outlet 86 is located at the right end of the guide 85.

The direction converter 85A has a left end connected to the periphery of the disk 84. The left end of the intermediate guide 85B is connected to the right end of the direction converter 85A with a step between them. The left end of the cover 85C is connected to the right end of the intermediate guide 85B with a step between them. In the radial direction, the distance between the rotation axis AX and the inner peripheral surface of the direction converter 85A is greater than the distance between the rotation axis AX and the inner peripheral surface of the intermediate guide 85B. In the radial direction, the distance between the rotation axis AX and the inner peripheral surface of the intermediate guide 85B is greater than the distance between the rotation axis AX and the inner peripheral surface of the cover 85C. In other words, the inner peripheral surface of the direction converter 85A is more away from the rotation axis AX than the inner peripheral surfaces of the intermediate guide 85B and the cover 85C.

The direction converter 85A is located radially outward from the cooling fan 20. The direction converter 85A surrounds the cooling fan 20. The direction converter 85A faces the outflow port 20F of the cooling fan 20.

The cover 85C is located radially outward from the heat-radiating fins 61. The cover 85C surrounds the heat-radiating fins 61. The cover 85C faces the radially outer ends of the heat-radiating fins 61. The cover 85C is in contact with the radially outer ends of the heat-radiating fins 61. The cover 85C may face the radially outer ends of the heat-radiating fins 61 across a small clearance.

The disk 84 is located leftward from the cooling fan 20. The inlet 83 of the duct 80 is located leftward from the inflow port 20A of the cooling fan 20. The inlet 83 of the duct 80 faces the inflow port 20A of the cooling fan 20. The inlet 83 aligns with at least a part of the inflow port 20A in the radial direction.

The housing 2 has the inlet port 2A in its left portion. As the rotor shaft 29 rotates to rotate the cooling fan 20, air outside the housing 2 flows into the internal space of the housing 2 through the inlet port 2A and flows toward the inlet 83. The air flowing toward the inlet 83 flows into the inflow port 20A of the cooling fan 20 through the inlet 83 and flows out through the outflow port 20F.

Each heat-radiating fin 61 extends in the axial direction (lateral direction) parallel to the rotation axis AX. The multiple heat-radiating fins 61 are located circumferentially at intervals about the rotation axis AX. The heat-radiating fins 61 include fin passages 65 defined between heat-radiating fins circumferentially adjacent to each other. Each fin passage 65 extends in the axial direction.

The guide 85 guides air from the cooling fan 20 into the fin passages 65.

The direction converter 85A is located radially outward from the cooling fan 20. Air flows radially outward through the outflow port 20F of the cooling fan 20. The air flowing out through the outflow port 20F flows toward the direction converter 85A while being guided along the right surface of the disk 84, and hits the inner peripheral surface of the direction converter 85A to flow rightward. More specifically, the air hitting the inner peripheral surface of the direction converter 85A is directed to the intermediate guide 85B and the cover 85C located rightward from the direction converter 85A. The air hitting the inner peripheral surface of the direction converter 85A flows toward the fin passages 65 while being guided by the inner peripheral surface of the intermediate guide 85B.

The cover 85C covers the fin passages 65 from radially outside. The cover 85C has its inner peripheral surface in contact with the radially outer ends of the heat-radiating fins 61. The fin passages 65 are thus substantially closed. Air flowing rearward from the inner peripheral surface of the intermediate guide 85B flows into the fin passages 65 while being guided along the inner peripheral surface of the cover 85C. The cover 85C covers the fin passages 65 from radially outside, thus restricting the air flowing into the fin passages 65 from leaking through the fin passages 65. This allows a sufficient amount of air to be supplied to the heat-radiating fins 61, thus allowing a sufficient amount of air to come in contact with the heat-radiating fins 61. The motor case 13 is thus cooled efficiently.

Air flowing through the fin passages 65 is supplied to a space 88 above the guide 85 after flowing out through the outlet 86.

The controller 6 is located above the guide 85. The controller 6 includes a circuit board on which multiple electronic components are mounted. Examples of the electronic components mounted on the circuit board include a processor such as a central processing unit (CPU), a non-volatile memory such as a read-only memory (ROM) or a storage device, a volatile memory such as a random-access memory (RAM), a transistor, and a resistor. The controller 6 is accommodated in a controller case 6A. Air flowing out of the fin passages 65 through the outlet 86 passes below the controller 6. The air passes below the controller 6 while being in contact with the lower surface of the controller case 6A.

The first duct 81 in the present embodiment includes a controller support 87 connected to the controller case 6A. The controller support 87 is located above the guide 85. The controller support 87 has its left end connected to an upper end of the disk 84. The controller support 87 is in contact with a left portion, a front portion, and a rear portion of the controller case 6A. The controller case 6A includes its right portion in contact with a support 202 located on the inner surface of a right portion of the housing 2. The space 88 is defined by the support 202, the controller case 6A, the controller support 87, the guide 85, and the support 200. The housing 2 has the outlet port 2B (refer to FIG. 1) in a front portion of the space 88. Air supplied into the space 88 through the outlet 86 then flows out of the housing 2 through the outlet port 2B.

As described above, the electric work machine 1 according to the present embodiment includes the motor 12 and the saw chain 10 that is an output unit. The motor 12 includes the stator 27, the rotor 28 rotatable relative to the stator 27, and the rotor shaft 29 fixed to the rotor 28. The saw chain 10 is driven by the rotor shaft 29. The electric work machine 1 includes the motor case 13 accommodating the stator 27 and the rotor 28. The motor case 13 has an outer surface receiving the multiple heat-radiating fins 61. The electric work machine 1 includes the cooling fan 20 located outside the motor case 13 and rotatable by the rotor shaft 29. The electric work machine 1 includes the duct 80 including the guide 85 to guide air through the cooling fan 20 to the fin passages 65 between adjacent heat-radiating fins 61.

In the above structure, the rotor shaft 29 rotates the cooling fan 20 to supply air from the cooling fan 20 to the motor case 13. The motor case 13 with the heat-radiating fins 61 is cooled by air from the cooling fan 20. The guide 85 in the duct 80 guides air through the cooling fan 20 to the fin passages 65 between adjacent heat-radiating fins 61. This allows a sufficient amount of air to be supplied to the heat-radiating fins 61, thus allowing the motor case 13 to cool efficiently. The motor 12 accommodated in the motor case 13 is thus cooled through the motor case 13 when the motor 12 generates heat. This reduces the likelihood that the motor 12 malfunctions under heat, electronic devices around the motor 12 malfunction under heat, the components of the motor 12 deteriorate under heat, and electronic components around the motor 12 deteriorate under heat. The electric work machine 1 is thus driven appropriately.

Each of the multiple heat-radiating fins 61 in the present embodiment extends in the axial direction parallel to the rotation axis AX of the rotor 28. The multiple heat-radiating fins 61 are located circumferentially at intervals about the rotation axis AX. The guide 85 guides air between circumferentially adjacent heat-radiating fins 61.

In the above structure, air flows axially along the heat-radiating fins 61. The motor case 13 is thus cooled efficiently.

The guide 85 in the present embodiment includes a cover 85C facing the radially outer ends of the heat-radiating fins 61. The cover 85C covers the fin passages 65.

The cover 85C restricts air flowing through the fin passages 65 from leaking out of the fin passages 65. This allows a sufficient amount of air from the cooling fan 20 to come in contact with the heat-radiating fins 61. The motor case 13 is thus cooled efficiently.

The cover 85C in the present embodiment is in contact with the ends of the heat-radiating fins 61 or faces the ends of the heat-radiating fins 61 across a clearance.

The fin passages 65 are substantially closed with the cover 85C. This allows a sufficient amount of air from the cooling fan 20 to come in contact with the heat-radiating fins 61. The motor case 13 is thus cooled efficiently.

The guide 85 in the present embodiment includes the direction converter 85A located radially outward from the cooling fan 20 to supply air from the cooling fan 20 to the cover 85C.

This allows air from the cooling fan 20 to be smoothly supplied to the cover 85C through the direction converter 85A.

The cooling fan 20 in the present embodiment is a centrifugal fan with the inflow port 20A and the outflow port 20F. The cooling fan 20 has the inflow port 20A at one end in the axial direction, and the outflow port 20F on the radially outward peripheral edge. The direction converter 85A faces the outflow port 20F.

This allows the direction converter 85A to smoothly supply air blown out through the outflow port 20F of the cooling fan 20 to the cover 85C.

The duct 80 in the present embodiment has the inlet 83 facing the inflow port 20A.

This causes air to flow into the inflow port 20A of the cooling fan 20 through the inlet 83 of the duct 80.

In the present embodiment, the distance between the rotation axis AX and the direction converter 85A is greater than the distance between the rotation axis AX and the cover 85C in the radial direction.

The direction converter 85A is located away from the cooling fan 20 in the radial direction, thus reducing any pressure drop of air from the cooling fan 20 to the fin passages 65.

The electric work machine 1 according to the present embodiment includes the controller 6 for the motor 12 above the duct 80. Air flowing out of the fin passages 65 passes below the controller 6.

This allows the controller 6 to be cooled by the air flowing out of the fin passages 65.

Other Embodiments

In the above embodiments, the motor 12 is a brushless inner-rotor motor. The motor 12 may be an outer-rotor brushless motor. In the outer-rotor brushless motor, the teeth protrude radially outward from the annular yoke.

The electric work machine 1 according to the above embodiments is a chain saw, which is an example of outdoor power equipment. The outdoor power equipment may not be a chain saw. Examples of the outdoor power equipment include a hedge trimmer, a lawn mower, a mowing machine, and a blower. The electric work machine 1 may be a power tool. Examples of the power tool may include a driver drill, a vibration driver drill, an angle drill, an impact driver, a grinder, a hammer, a hammer drill, a circular saw, and a reciprocating saw.

In the above embodiments, the electric work machine is powered by the battery pack attached to the battery mount. In some embodiments, the electric work machine may use utility power (alternating current power supply).

REFERENCE SIGNS LIST 1 electric work machine
2 housing
2A inlet port
2B outlet port
3 front grip
4 hand guard
5 battery cover
6 controller
6A controller case
7 trigger lock lever
8 trigger switch
9 guide bar
10 saw chain (output unit)
11 motor assembly
12 motor
13 motor case
14 motor compartment
15 battery holder
16 rear grip
18 bearing
18L left bearing
18R right bearing
19 heat-transfer resin portion
20 cooling fan
20A inflow port
20F outflow port
21 sensor magnet
22 sensor board
23 seal
25 seal
25L seal
25R seal
26 seal
27 stator
28 rotor
29 rotor shaft
30 stator core
31 insulator
32 coil
33 busbar unit
34 yoke
35 tooth
46 power line
54 rotor core
55 rotor magnet
56 magnet slot
57 hollow portion
58 cylindrical member
60 body
60A cylindrical portion
60B extension
60C wall
61 heat-radiating fin
62 lid
62A disk
62B extension
63 opening
65 fin passage
69 screw boss
70 screw boss
71 screw
72 shaft hole
72L shaft hole
72R shaft hole
73 fan bush
74 magnetic sensor
76 resin film
79 wiring path
80 duct
80A screw boss
80B screw boss
80C recess
80D recess
81 first duct
82 second duct
83 inlet
84 disk
85 guide
85A direction converter
85B intermediate guide
85C cover
86 outlet
87 controller support
88 space
92 fixing member
95 peripheral wall
96 fastener
99 screw
100 screw
101 peripheral wall
101L peripheral wall
101R peripheral wall
108L stopper
108R stopper
109 recess
200 support
201 sprocket
202 support

What is claimed is:
1. An electric work machine, comprising:
a motor including
  a stator,
  a rotor rotatable relative to the stator, and
  a rotor shaft fixed to the rotor;
an output unit drivable by the rotor shaft;
a plurality of heat-radiating fins;
a motor case having an outer surface receiving the plurality of heat-radiating fins, the motor case accommodating the stator and the rotor;
a cooling fan located outside the motor case and rotatable by the rotor shaft; and
a duct including a guide to guide air through the cooling fan to a fin passage between adjacent heat-radiating fins of the plurality of heat-radiating fins, wherein the guide includes
a cover facing radially outer ends of the plurality of heat-radiating fins and covering the fin passage, and
a direction converter located radially outward from the cooling fan and configured to supply air from the cooling fan to the cover.

2. The electric work machine according to claim 1, wherein
each of the plurality of heat-radiating fins extends in an axial direction parallel to a rotation axis of the rotor,
the plurality of heat-radiating fins are located circumferentially at intervals about the rotation axis, and
the guide guides air to the fin passage between circumferentially adjacent heat-radiating fins of the plurality of heat-radiating fins.

3. The electric work machine according to claim 1, wherein
the cover is in contact with the ends of the plurality of heat-radiating fins or faces the ends of the plurality of head-radiating fins across a clearance.

4. The electric work machine according to claim 1, wherein
the cooling fan includes a centrifugal fan with an inflow port and an outflow port,
the inflow port is located at one end of the cooling fan in the axial direction,
the outflow port is on a radially outward peripheral edge of the cooling fan, and
the direction converter faces the outflow port.

5. The electric work machine according to claim 4, wherein
the duct has an inlet facing the inflow port.

6. The electric work machine according to claim 1, wherein
a distance between the rotation axis and the direction converter is greater than a distance between the rotation axis and the cover in a radial direction.

7. The electric work machine according to claim 1, further comprising:
a controller located above the guide and configured to control the motor,
wherein air flowing out of the fin passage passes below the controller.

8. The electric work machine according to claim 4, wherein
a distance between the rotation axis and the direction converter is greater than a distance between the rotation axis and the cover in a radial direction.

9. The electric work machine according to claim 5, wherein
a distance between the rotation axis and the direction converter is greater than a distance between the rotation axis and the cover in a radial direction.

10. The electric work machine according to claim 2, further comprising:
a controller located above the guide and configured to control the motor,
wherein air flowing out of the fin passage passes below the controller.

11. The electric work machine according to claim 3, further comprising:
a controller located above the guide and configured to control the motor,
wherein air flowing out of the fin passage passes below the controller.

12. The electric work machine according to claim 4, further comprising:
a controller located above the guide and configured to control the motor,
wherein air flowing out of the fin passage passes below the controller.

13. The electric work machine according to claim 5, further comprising:
a controller located above the guide and configured to control the motor,
wherein air flowing out of the fin passage passes below the controller.

14. The electric work machine according to claim 6, further comprising:
a controller located above the guide and configured to control the motor,
wherein air flowing out of the fin passage passes below the controller.

15. An electric work machine, comprising:
a motor including
a stator,
a rotor rotatable relative to the stator, and
a rotor shaft fixed to the rotor;
an output unit drivable by the rotor shaft;
a plurality of heat-radiating fins;
a motor case having an outer surface receiving the plurality of heat-radiating fins, the motor case accommodating the stator and the rotor;
a cooling fan located outside the motor case and rotatable by the rotor shaft; and
a duct covering a fin passage between adjacent heat-radiating fins of the plurality of heat-radiating fins, the duct configured to allow outside air to pass through the fin passage,
wherein the guide includes
a cover facing radially outer ends of the plurality of heat-radiating fins and covering the fin passage, and
a direction converter located radially outward from the cooling fan and configured to supply air from the cooling fan to the cover.

* * * * *